United States Patent

Hirai et al.

[19]

[11] Patent Number: 5,974,371
[45] Date of Patent: Oct. 26, 1999

[54] DATA PROCESSOR FOR SELECTIVELY TRANSLATING ONLY NEWLY RECEIVED TEXT DATA

[75] Inventors: Tokuyuki Hirai, Nara; Kazuo Nishiura, Yamatokoriyama, both of Japan

[73] Assignee: Sharp Kabushiki Kaisha, Osaka, Japan

[21] Appl. No.: 08/808,662

[22] Filed: Feb. 28, 1997

[30] Foreign Application Priority Data

Mar. 21, 1996 [JP] Japan .................................. 8-064328

[51] Int. Cl.[6] ............................ G06F 17/28; G06F 13/00; G06F 15/16
[52] U.S. Cl. ................................................ 704/2; 709/224
[58] Field of Search ........................ 704/1–7; 395/200.3, 395/200.31, 200.32, 200.33; 709/224

[56] References Cited

U.S. PATENT DOCUMENTS

| 5,075,850 | 12/1991 | Asahioka et al. | 704/2 |
| 5,140,522 | 8/1992 | Ito et al. | 704/2 |
| 5,568,383 | 10/1996 | Johnson et al. | 704/2 |
| 5,701,497 | 12/1997 | Yamauchi et al. | 704/2 |
| 5,715,466 | 2/1998 | Flanagan et al. | 704/2 |

FOREIGN PATENT DOCUMENTS

| 0449230 | 10/1991 | European Pat. Off. | G06F 15/38 |
| 0590332 | 4/1994 | European Pat. Off. | G06F 15/38 |
| 2-68662 | 3/1990 | Japan . | |
| 2-195479 | 8/1990 | Japan . | |
| 2266390 | 10/1993 | United Kingdom | G06F 15/38 |
| 8902131 | 3/1989 | WIPO | G06F 15/40 |

OTHER PUBLICATIONS

Hong Koon Kim et al.; "A Presentation Agent for Multilingual Services"; *Institute of Electrical and Electronics Engineers;* vol. 2 of 3, Feb. 14, 1994; pp. 635–644.

*Primary Examiner*—Joseph Thomas
*Assistant Examiner*—Patrick N. Edouard

[57] ABSTRACT

The invention provides a data processor comprising a receiving device for receiving data from a network, a memory for storing the data received by the receiving device, an output device for outputting the data stored in the memory, and a translator for translating an original text written in a first language into a translated text written in a desired second language. Text data in the received data written in the first language is translated into the second language by the translator upon receipt of the data from the receiving device, the text data translated into he second language is stored in the memory, and the text data translated into the second language by the translator is output by the output device.

21 Claims, 10 Drawing Sheets

FIG. 3

TRANSLATION RESULT MANAGEMENT TABLE

| URL OF ORIGINAL TEXT | FILE NAME ON DISK | VALID/ INVALID TRANSLATION | THE NUMBER OF TRANSLATED SENTENCES |
|---|---|---|---|
| Http://url1 | Url1.kekka | VALID | 32 |
| Http://url2 | Url2.kekka | INVALID | 0 |
| Http://url3 | Url3.kekka | VALID | 0 |
| Http://url4 | Url4.kekka | VALID | 56 |

11

URL DATA BUFFER FOR CURRENT PROCESS

| Http://url4 | Url4.kekka | VALID | 56 |
|---|---|---|---|

12

DATA PROCESSOR FOR SELECTIVELY TRANSLATING ONLY NEWLY RECEIVED TEXT DATA

BACKGROUND OF THE INVENTION

1. Field of the Invention

The present invention relates to a data processor for translating data and more particularly a data processor for automatically translating data received from networks.

2. Description of Related Art

Conventionally, for translating a string of characters or for using a dictionary function to look for the meaning of a word when one uses an application, it is necessary to follow the procedure described below.

First, an application is started up for inputting a set of character strings and then the set of character strings is input. Thereafter, character strings in the set to be translated are selected and stored in a file. Next, a translation application or a dictionary application is activated to start a desired processing, i.e., translation of the character strings or consultation of the dictionary. Then, the obtained result is displayed.

In the above-described conventional procedure, all the steps except the last output of the obtained result must be operated by a user, including the indication of what part of the input character strings to translate.

Japanese Unexamined Patent Publication (Kokai) No. Hei 2(1990)-195479 discloses a technique for translating original text data read by an optical reading device and printing the translation result. In this technique, however, the reading operation serves as an instruction key for the start of translation.

Further, since original data must conventionally be stored in a file before translation, it is impossible to start translation of a document having character strings and drawings together before all data for the document is collected (in the case of the optical reading device, all data is read. This is because such a document cannot be stored in a file before all data becomes ready.

SUMMARY OF THE INVENTION

In order to cope with the above problems, an object of the present invention is to provide a data processor for translating information and electric mail received from a network, automatically, upon receipt of the information and the electric mail.

One object of the present invention is to provide a data processor for translating received data automatically without a translation instruction by a user.

Another object of the present invention is to provide a data processor for translating received data in the background while displaying the received data.

Still another object of the present invention is to provide a data processor which accepts cancellation of the automatic translation, in order to prevent trouble during the automatic translation.

A further object of the present invention is to provide a data processor to, when the same data is received twice or more, output a first translation in order to avoid repeated translation of the data.

A further object of the present invention is to provide a data processor to, when a part of received data is identical with previously translated data, translate the received data, except the identical part, in order to shorten the time for translation.

A further object of the present invention is to provide a data processor to, when an environment for translation is changed, translate data again in accordance with the changed translation environment.

A still further object of the present invention is to provide a data processor to provide a user with option of choosing the automatic translation or a manually instructed translation.

As mentioned above, according to the present invention, the translation of data can be started without a user's special instruction and therefore the user does not need to discontinue a current operation or interrupt the display of the data to initiate the translation. Also, when the translation of data is canceled during the course and the same data is again received, only an untranslated portion part of the data is translated since the portion of the data translated before the cancellation is stored. Further, when the translation of data is canceled maintained, conformity is maintained between the translation before the cancellation and that after the cancellation.

Therefore, the present invention provides a data processor comprising a receiver for receiving data from a network, a memory for storing the data received by the receiver, an output device for outputting the data stored in the memory, and a translator for translating an original text written in a first language into a translated text written in a desired second language, wherein the received text data written in the first language is translated into the second language upon receipt of the data, the text data translated into the second language is stored in the memory, and the text data translated into the second language is output by the output device.

In another aspect, the present invention provides a data processor comprising a receiver for receiving data from a network, a memory for storing the received data, an output device for outputting the data stored in the memory, and a translator for translating an original text written in a first language into a translated text written in a desired second language, wherein received text data written in the first language is translated into the second language upon receipt of the data from the receiver, the text data translated into the second language is stored in the memory, the received data except the text data is output by the output device, and subsequently the text data translated into the second language is output.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 3 illustrates inner buffers in an embodiment of the data processor in accordance with the present invention;

DESCRIPTION OF THE PREFERRED EMBODIMENTS

The data processor of the present invention preferably includes a translation cancellation device for canceling translation during the translation process.

The data processor of the present invention preferably includes a comparator means for comparing the received data with the data stored in the memory and, when the data received is identical with the data stored in the memory, the received data is not translated and the data stored in the memory is output.

Further, when the comparator judges that a part of the data received is already stored in the memory, the translator translates only the other part of the received data.

The data processor of the present invention preferably includes a translation environment memory for storing the translation environment for the data stored in the memory. The current translation environment is compared with the translation environment stored in the translation environment memory. Finally, the data is translated again by the translator when the above two translation environments are not identical.

The data processor of the present invention preferably includes a translation mode setter for selectively setting manually instructed translation or the automatic translation in which, upon receipt of the received data, the text data written in the first language is translated into the second language and the obtained translation is stored in the memory.

The present invention will hereinafter be described in detail by way of examples thereof, which are not intended to limit the scope of the invention, as shown in the attached drawings.

Here, as one embodiment of the present invention, an apparatus provided with a "WWW browser" receiving and displaying data on Ethernet as an application with a further addition of a translator, for example.

Figure 1:
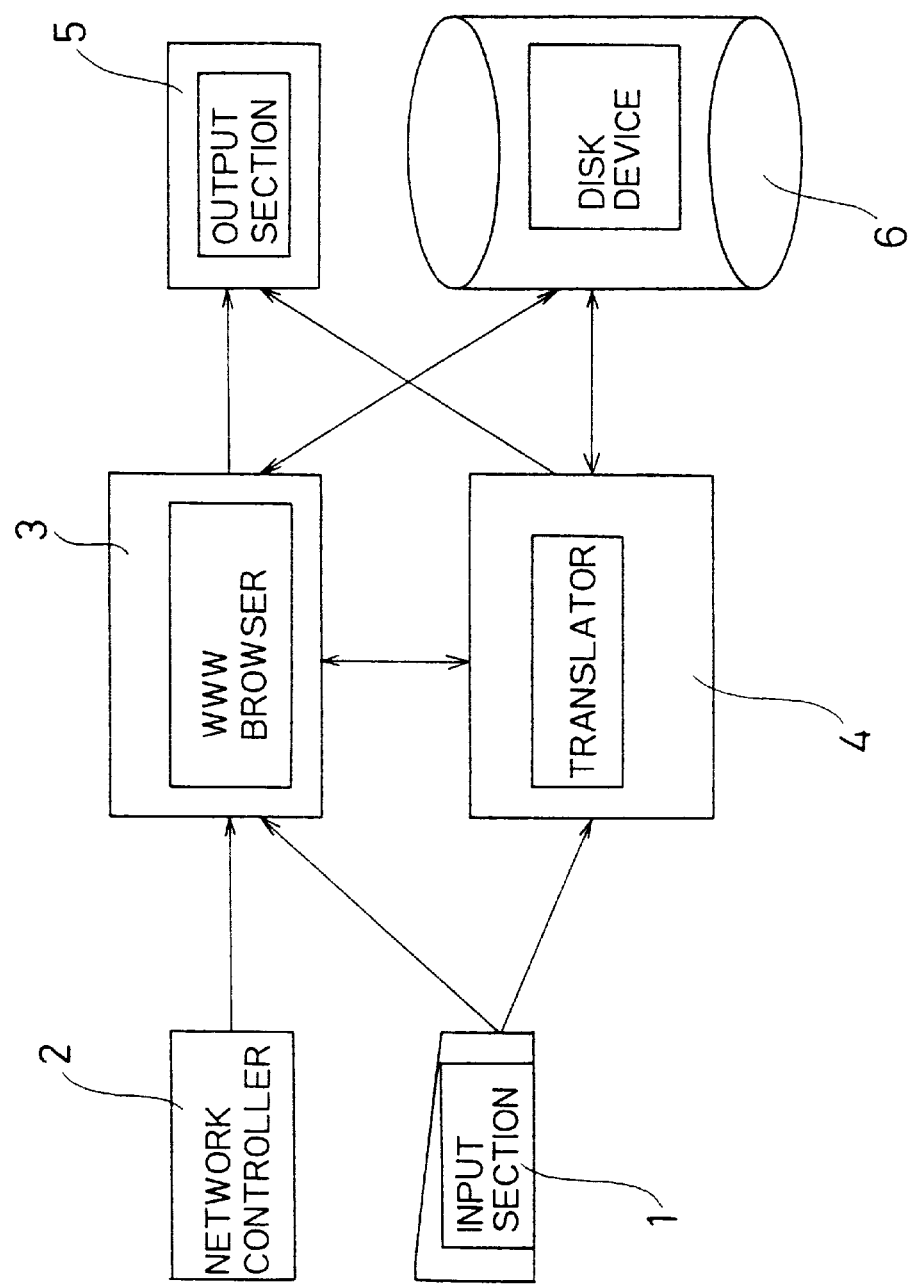
FIG. 1 is a block diagram illustrating an exemplary construction of an embodiment of the data processor in accordance with the present invention.
Figure 2:
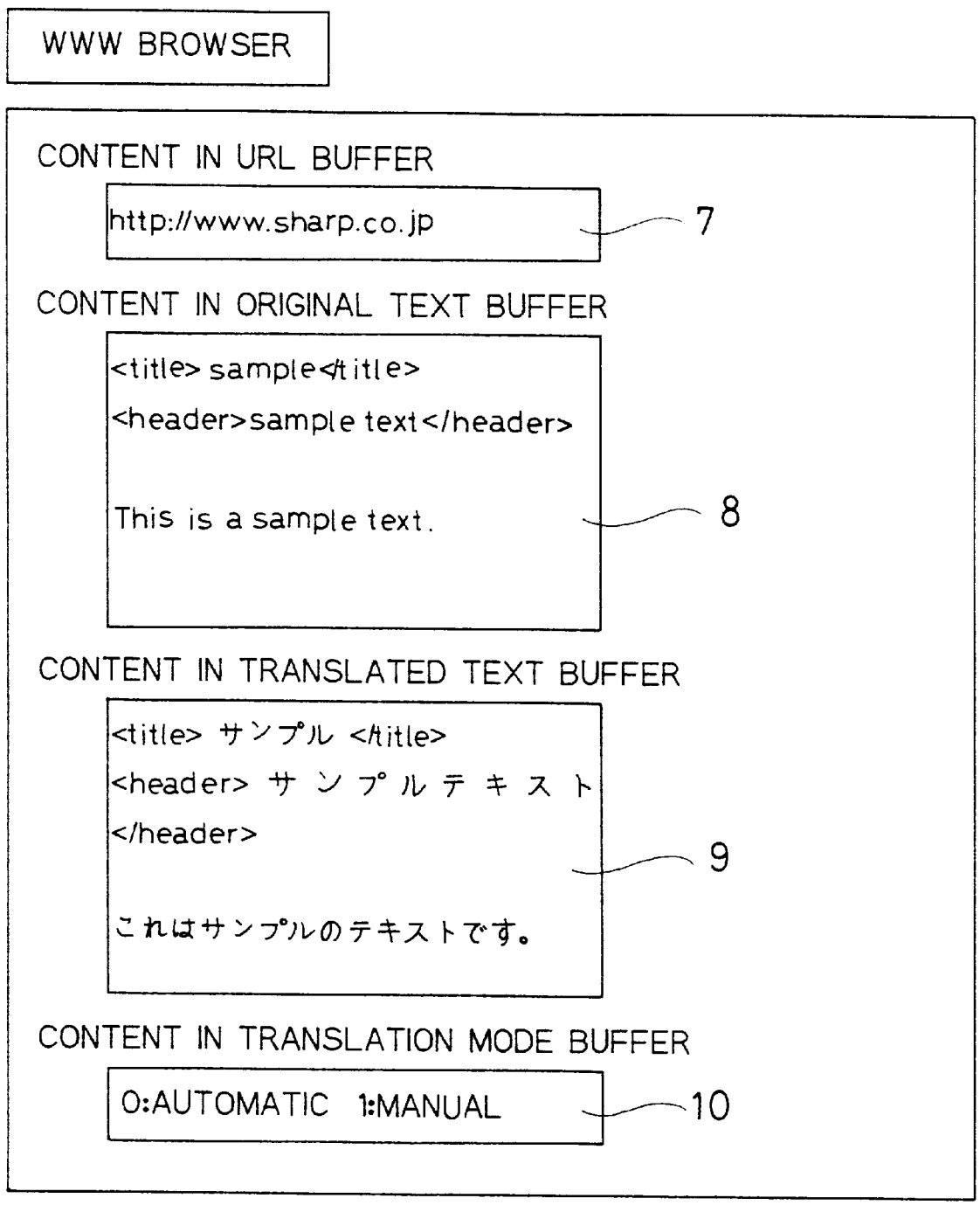
FIG. 2 illustrates inner buffers in the WWW browser in an embodiment of the data processor in accordance with the present invention.
Figure 4:
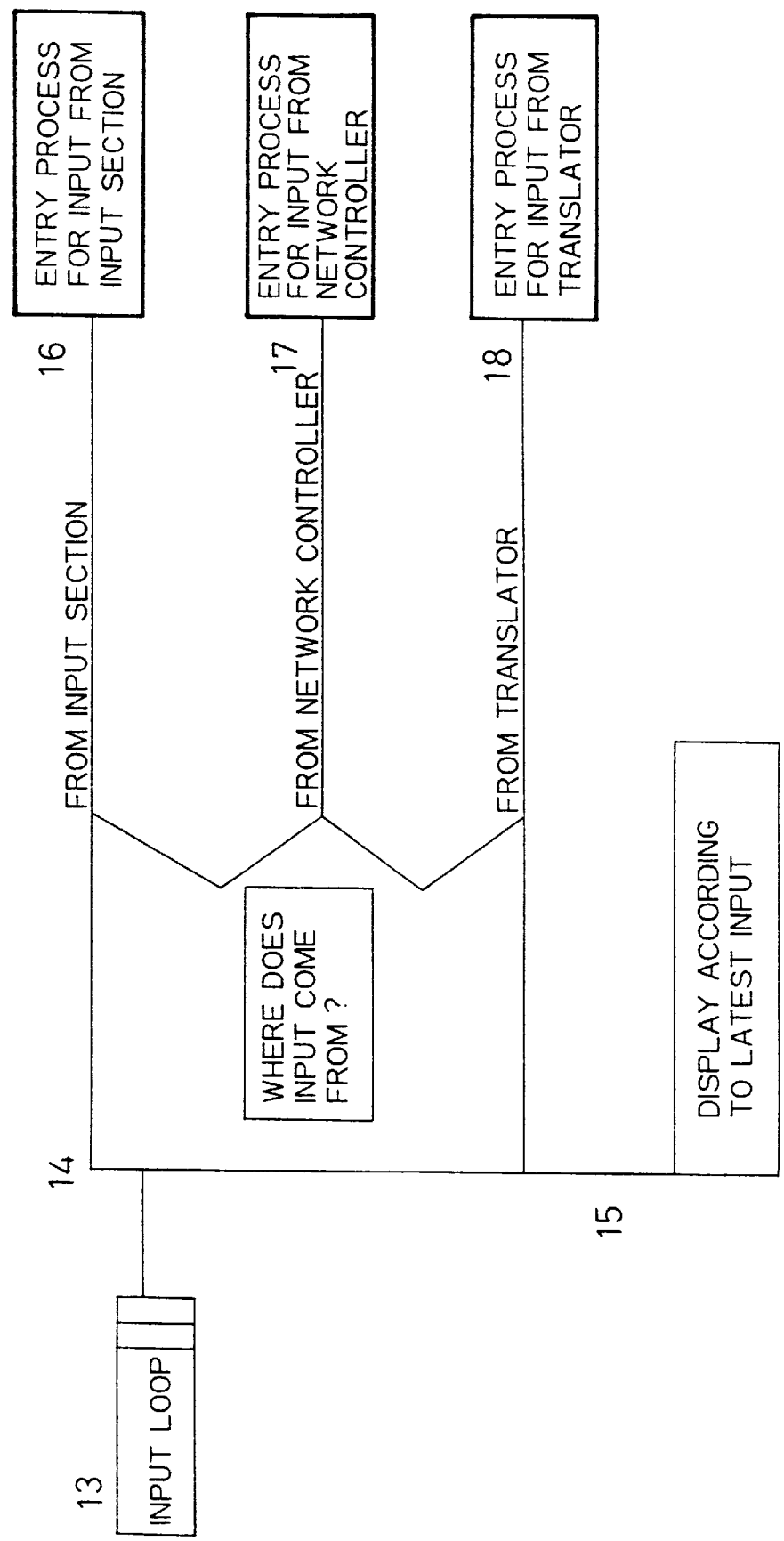
FIG. 4 is a flowchart explaining process of a WWW browser in an embodiment the data processor in accordance with the present invention.
Figure 5:
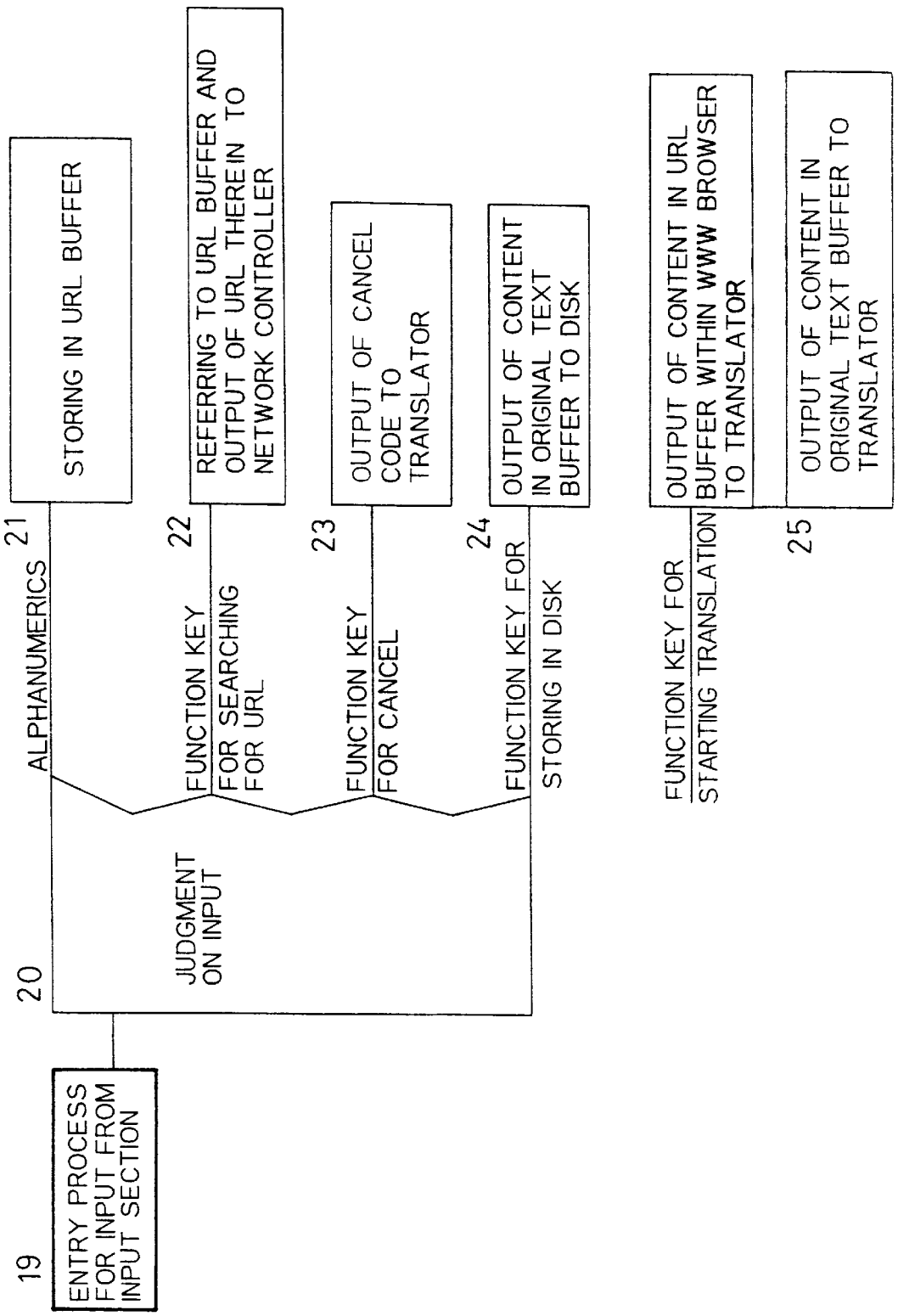
FIG. 5 is a flowchart explaining an entry process for input in an embodiment of the data processor in accordance with the present invention.
Figure 6:
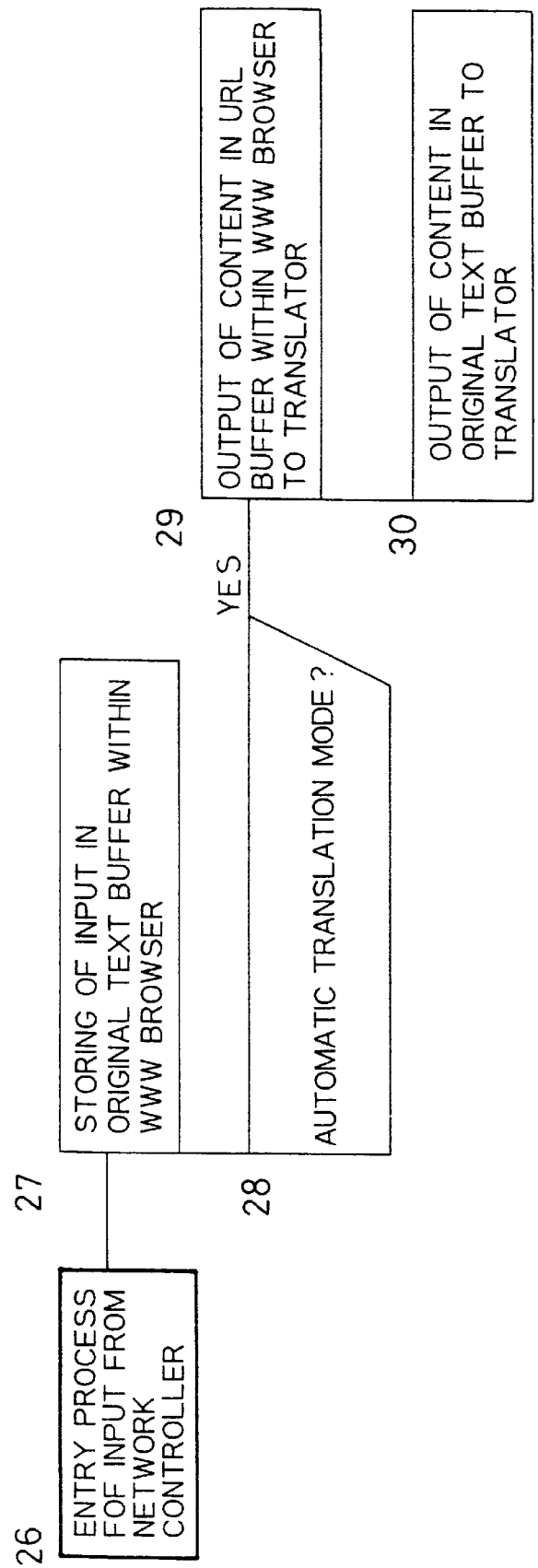
FIG. 6 is a flowchart explaining the selection process of a translation mode in an embodiment of the data processor in accordance with the present invention.
Figure 7:
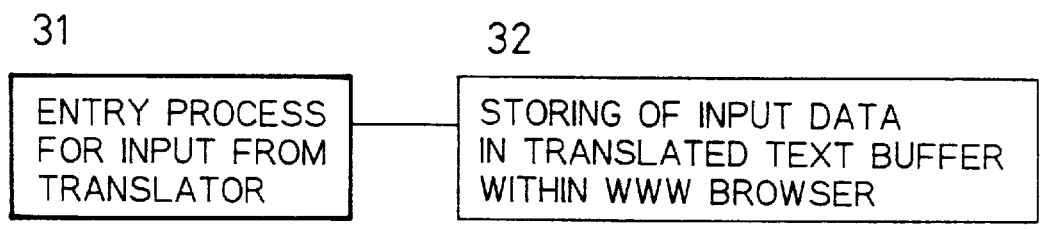
FIG. 7 is a flowchart explaining storage process in a translated text buffer in an embodiment of the data processor in accordance with the present invention.
Figure 8:
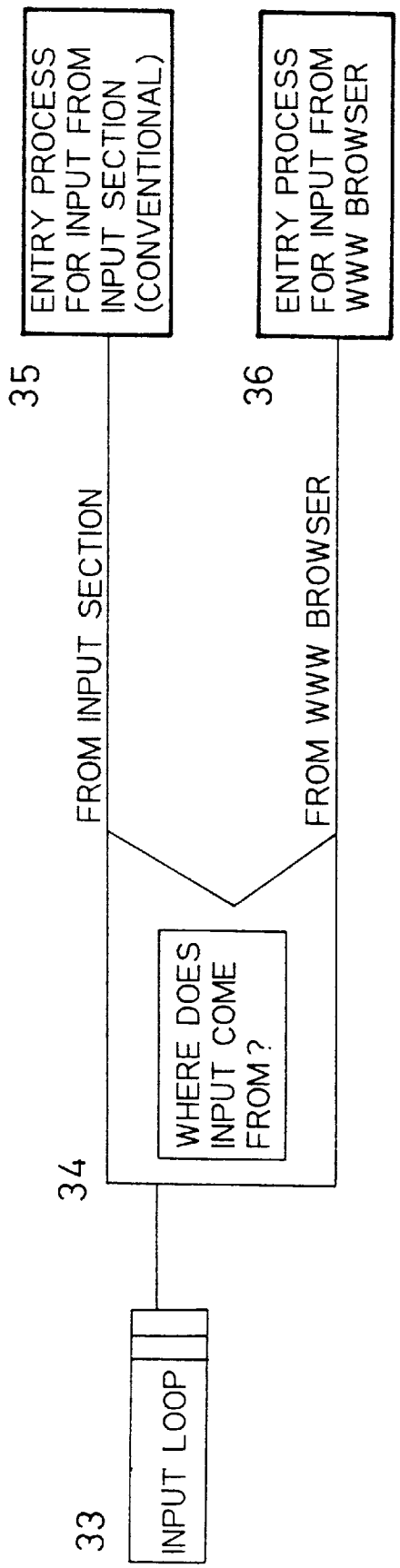
FIG. 8 is a flowchart explaining a judgment process on input in an embodiment of the data processor in accordance with the present invention.
Figure 9:
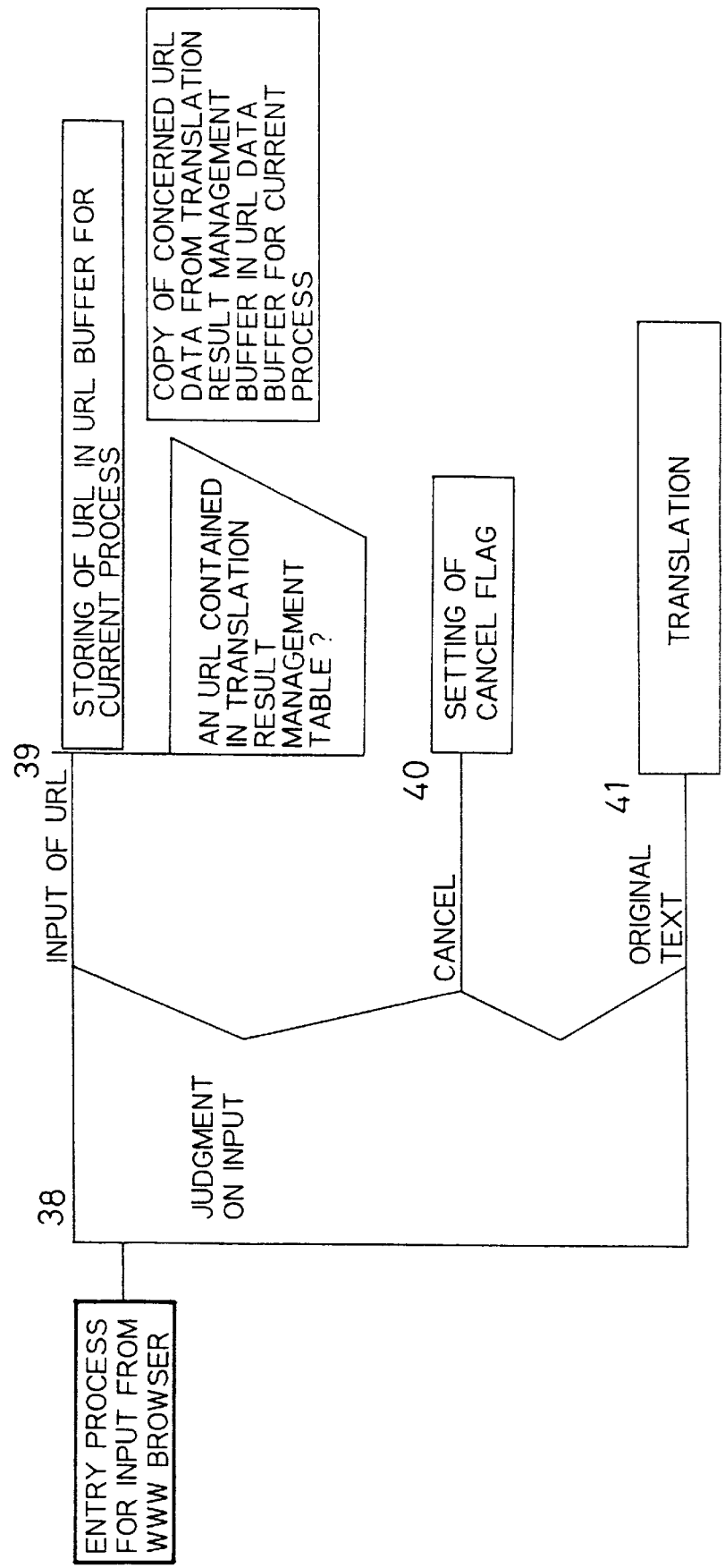
FIG. 9 is a flowchart explaining a process of judgment on input data in an embodiment of the data processor in accordance with the present invention.
Figure 10:
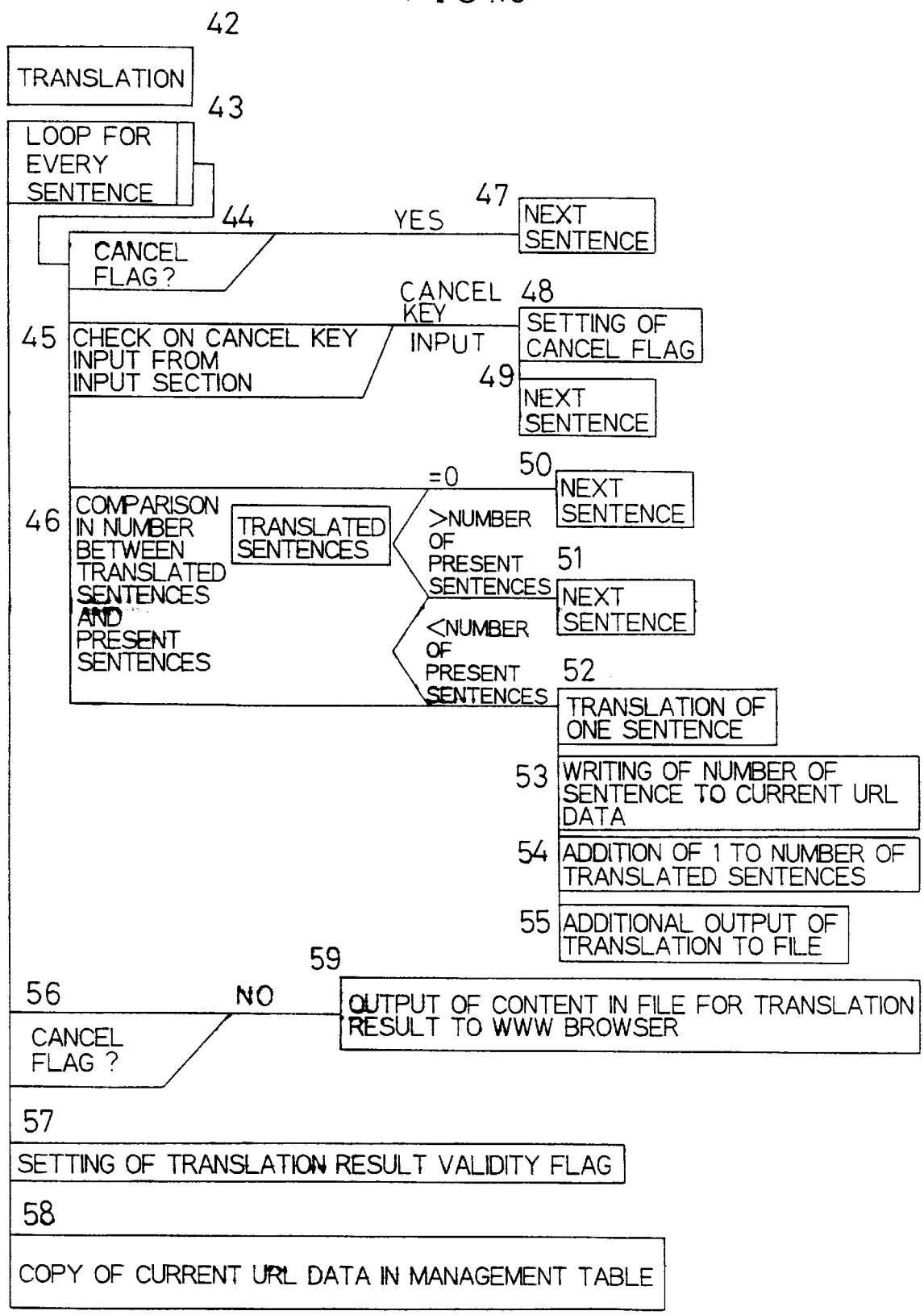
FIG. 10 is a flowchart explaining a translation process in an embodiment of the data processor in accordance with the present invention.

Referring to FIG. 1 illustrating an exemplary construction of an embodiment of the present invention, an input section 1 receives an input by a user and a network controller 2 receives data from dial-up lines or from Ethernet. The WWW browser 3 receives the input by the user from the input section 1, takes internet data from the network controller 2 in accordance with the user's direction and displays the internet data on an output section 5. A translator 4 translates the original text received from the WWW browser and the output section 5 displays the original text or the translated text in accordance with a direction from the WWW browser 3. A disk device 6 keeps a file for the text translated by the translator 4.

The apparatus with the WWW browser 3, receiving the two kinds of inputs as shown in this embodiment (the input from the input section and from the network controller), performs the following functions like a conventional apparatus:

(1) To receive a direction input by the user at the input section 1 and perform an operation required by the input direction. When it receives an alphanumeric string (FIG. 4–13 & 14), the input alphanumeric string is stored in a buffer [URL (Uniform Resource Location) buffer] within the WWW browser 3 (FIG. 4–16) and also displayed on the output section (FIG. 4–15). FIG. 2–7 shows an example of the contents stored in the URL buffer.

When an input distinguished from alphanumerics, such as an input via a function key (FIG. 4–13 & 14) is received, data designated by the content of the URL buffer is demanded from the network controller 2 (FIG. 5–22).

(2) To receive the internet data from the network controller 2 (FIG. 4–13 & 14) and store the internet data in a buffer (original text buffer) within the WWW browser (FIG. 5–24).

(3) To display the content in the original text buffer on the output section (FIG. 4–15).

(4) To store the internet data within the WWW browser in the disk device when the user wants translation of the internet data (FIG. 5–24).

(5) The translator To translate the content in the disk device by the translator, store the obtained translation within the translator and output the translation on the output section.

To the above described functions, the following functions are added in the embodiment of the present invention.

(1) To output the original text of the internet data to the translator 4 at a time appropriate for translation, for example, at any time when internet data is received (FIG. 5–20 & 21).

(2) The translator 4 is constructed so as to receive an input from the WWW browser 3 (FIG. 8–36), translate the received original text sentence by sentence (FIG. 10–43 & 52) and output the obtained translation to the WWW browser 3 (FIG. 10–59).

(3) The WWW browser 3 receives the input from the translator and outputs the obtained translation on the output section (FIG. 4–15).

Since the WWW browser 3 and the translator 4 are independent of each other, the WWW browser 3 can continue to receive inputs from the input section 1 and the network controller 2 without waiting for the output by the translator 4. For this purpose, according to the present invention, an input port of the WWW browser 3 which receives the input from the input section 1 and the network controller performs an additional function to receive the output by the translator 4 (FIG. 4–13, 14, 18).

Next, the cancellation of translation will be explained. In the embodiment, the translator 4 operates in the background of the WWW browser 3 and does not receive an input from the user. If the translator is constructed so as to receive an input via the input section, such a cancellation function as disclosed in the present invention is not necessary, but the user must consciously discriminate the input to the WWW browser from that to the translator 4.

To avoid such complication, in this embodiment, the WWW browser 3 has a function to receive an instruction to cancel the translation (FIG. 5–23).

The translator 4 receives the cancel instruction from the WWW browser 3 (FIG. 9–38 & 40 and FIG. 10–45), keeps the cancel instruction as a flag (FIG. 9–40 and FIG. 10–48), check the flag at the beginning of a loop for every sentence (FIG. 10–44) and skips over the input of the sentence when the flag is set (FIG. 10–47).

In this embodiment, this cancel flag is checked for every sentence and the process goes to the next sentence. However, since the flag remains set until the last sentence is input, all the sentences after the setting of the flag is set are skipped, as a result. For optimizing the system, such an exceptional step should be introduced as it allows exit from the loop and abandonment of all the input.

Next, a cache function in the present invention will be explained. The translator 4 stores the obtained translation on the disk. At this time, the obtained translation is related to URL of the original text. For this purpose, the translator is provided with a translation result management table therein (FIG. 3–11). The translation result management table has URLs and file names for storing translated texts for a plurality of original texts. In addition to that, the translation result management table has flags representing current validity or invalidity of the translation results as well as data as to the number of translated sentences in the original texts, for the purposes described below.

For this translation result management table, URL data for the original texts is required and the URL data is sent from the WWW browser to the translator preceding the output of the original text (FIG. 6–29). The translator receives the output of the URL data (FIGS. 9–38 & 39) and stores the URL data in a URL data buffer for the current process within the translator (FIGS. 38 & 39).

After the completion of the translation, the translation result management buffer contains "URL data of the original text," "file name for storing the translated text," "the translation being valid (FIG. 10–57)" and "0(=the whole text being translated)". Using these data, the translation result is retrieved from the file without repeating translation when the same UR1 is directed. Thus the translation result can be output immediately.

Thus, the caching of the translated text is performed. Usually, the cached data needs no amendment unless the original text is changed. When the translation environment is changed, however, retranslation is required. The change in the translation environment includes, for example, registration of a new word in the dictionary and change in style from "desu-masu style" to "dearu style", for example, as often made by the user.

For such cases, a cache control section for controlling the caching of translated texts stores flags indicative of validity or invalidity of the translation results in cache files to store the translation results. When the translation environment is changed, the translation results are all voided and translation is done over again.

As previously discussed, an already translated text is output promptly by indicating the same URL. In some cases, however, after translation is canceled during the course, it becomes necessary to resume the translation. According to the present invention, since the part already translated before the cancellation is stored, the part is able to be utilized as it is. Thus, the time period to the output of the translation result can be shortened.

For realizing this, the data about the number of the already translated sentences is stored in the translator in connection with URL data. When the translation instruction is received again, the URL data, which is delivered preceding the original text data, is compared with the stored URL data to obtain information about what the number of the already translated sentences and the translation of the already translated sentences in the newly input original text are skipped (FIG. 10–50 & 51). Then, the remaining part of the original text is translated (FIG. 10–52 to 55), and the obtained translation is stored in addition to the already stored translation in the file to be output.

Although the above explanation is given for the automatic translation mode, it is possible to translate only the data designated by URL specified by the user by stopping the automatic translation and manually instructing the translation of the intended data.

For this purpose, a translation mode buffer is provided within the WWW browser 3. And the translation mode is set to automatic when the value of the translation mode buffer is 0 and to manual when the value of the translation mode buffer is 1, for example. When the switch of translation mode is input to the input device, the content in the translation mode buffer is toggled, that is to say, it will be switched to automatic if the current translation mode is manual, and it will be switched to manual if the current translation mode is automatic.

When the manually instructed translation is selected by the switching of mode, translation is never started without the instruction by the user. For this purpose, a logic which interprets the start of translation is added in the WWW browser 3.

When the translation instruction is input to the input device, URL data (FIG. 5–24) and the original text (FIG. 5–25) are output from the URL buffer and the original text buffer to the translator in the same manner as described with respect to the automatic translation.

According to the present invention, the data processor starts translation automatically in response to the receiver. Thus, the received data is automatically translated without any translation instruction by a user.

Further, according to the present invention, the data processor performs the translation by the translator with showing display by the display. Thus the received data is translated in the background while the original text thereof is displayed.

In the data processor of the present invention, the translation can be canceled during the course by giving an instruction of stopping the translation performed by the translator in order to prevent troubles in the automatic translation.

In the data processor of the present invention, the data received by the receiver is compared with the data stored in the memory so that, when the data received by the receiver is identical with the data stored in the memory, the data stored in the memory is displayed without the received data translated. Thus, when the same data is received twice or more, a first translated data is displayed and therefore repeated translation can be prevented.

In the data processor of the present invention, when a part of the received data is already translated and stored in the memory, only other part of the received data is translated. Therefore, when a part of the received data is identical with previously translated data, the time required for translation can be shortened.

The data processor of the present invention retains the translation environment for the translated data stored in the memory so that, when there is a change in translation environment, the data stored in the memory can be translated again in according with the new translation environment.

In the data processor of the present invention, the user can choose between the automatic translation mode and the manually instructed translation mode depending on the received data.

As discussed above, according to the present invention, when the user is using an application for reading a text in English, the translation is performed in the background without any specific operation by the user. Therefore operations by the user are simplified. Also, the translation is expected to be already completed when the user needs translation.

For avoiding potential troubles caused by the automatic translation which requires no intentional operations by the user, the translation can be canceled. Further, since the translation before the cancellation is stored, the translated data can be utilized when the translation is needed again after the cancellation, so that the required time for the translation can be optimized.

Such a cancel-restart process may provide the user with free control but the process can be troublesome when the user repeats the process. Therefore, in the data processor of the present invention, the automatic translation mode itself can be stopped optionally.

When the automatic translation is stopped and then the translation needs to be restarted, the translation mode may be switched to automatic if continuous translation is required. If only a single text needs translation, the intended text can be translated with the translation mode remaining switched to manual.

In addition, according to the present invention, since the translation and dictionary-consulting are started just after a sentence is received from a network, even the translation of a document having text data and drawings together, received from a network, can be started much earlier than by conventional translation applications and therefore the translation result thereof can be obtained much earlier. For, in general, a drawing has a larger amount of data than a text and therefore more time is required for obtaining the data of the drawing from a network than for obtaining the data of a text.

By use of the correspondence table for an input and its translation result, when the same information as received in the past is received, the translation is omitted and the translation result obtained previously is displayed swiftly. Also, when the translation of a text is once interrupted and then restarted, only the untranslated sentences are translated without the already translated sentences translated again, and thus the time for the completion of translation is shortened. In this case, when the translation environment is changed after the interruption, there was inconsistency between translation results before and after the interruption in the past. According to the present invention, however, consistent translation results in accordance with the current translation environment can be obtained by providing the correspondence table with the data indicative of the validity/invalidity of the translation results.

What is claimed is:

1. A data processor comprising:

receiving means for receiving data from a computer network;

a memory for storing the data received by the receiving means;

output means for outputting the received data stored in the memory;

comparison means for comparing, upon interruption of the receiving of data from the computer network, data received by the receiving means with received data previously stored in the memory, wherein, when a portion of the data received by the receiving means matches a portion of the received data previously stored in the memory, the received data is not translated and the received data previously stored in the memory is output by the output means; and translation means for translating, upon the comparison means failing to determine a match, the received data of a first language into a translated text of a second language, wherein the translated text is stored in the memory, and the translated text is output by the output means.

2. A data processor comprising:

receiving means for receiving data from a computer network;

a memory for storing the data received by the receiving means;

output means for outputting the data stored in the memory;

comparison means for comparing, upon interruption in the receiving of data from the computer network, data received by the receiving means with received data previously stored in the memory, wherein, when a portion of the data received by the receiving means matches a portion of the received data previously stored in the memory, the received data is not translated and the received data previously stored in the memory is output by the output means; and translation means for translating, upon the comparison means failing to determine a match, the received data of a first language into a translated text of a second language, wherein the translated text is stored in the memory, the received data other than the translated text is output by the output means, and subsequently the translated text is output by the output means.

3. The data processor according to claim 2 further comprising translation cancellation means for canceling translation by the translation means.

4. The data processor according to claim 1 or 2, wherein, when the comparison means determines that a portion of the received data has been previously stored in the memory, the translation means translates the received data, except for the stored portion.

5. The data processor according to claim 1 or 2, further comprising a translation environment memory for storing a translation environment for data stored in the memory, wherein a translation environment of the received data is compared with the translation environment stored in the translation environment memory and, when the translation environments do not match, the translation means translates the received data.

6. The data processor according to claim 1 or 2 further comprising translation mode setting means for selectively prohibiting the translation of text data of the first language into the second language upon receipt of input of the received data.

7. A data processor, comprising:

a receiver, adapted to receive data from a computer network;

a comparator, upon interruption of the receipt of data from the computer network, adapted to compare a portion of the received data with a portion of received data previously stored data;

a translator, adapted to translate the received data of a first language into a second language upon the comparator indicating that the portion of the received data and received data previously stored do not match; and an output device, adapted to output the translated data and output the received data upon a portion matching the received data previously stored, without translation.

8. The data processor of claim 7, further comprising:

a memory, adapted to store the received data.

9. The data processor of claim 8, wherein the received data and the received data previously stored further include a translation environment, the comparator being further adapted to compare the translation environments of the received data and received data previously stored and the translator being further adapted to translate the received data upon the comparator indicating that the translation environments do not match.

10. The data processor of claims 1, 2, or 7, wherein the portion of the received data includes a URL address.

11. The data processor of claim 14, wherein the received URL address is compared with a URL address of the received data previously stored, and the received data is not translated when the received URL address matches a URL address of the received data previously stored.

12. A data processing method, comprising the steps of:

receiving data from a computer network;

comparing, upon interruption of the receiving of data from the computer network, a portion of the received data with a portion of received data previously stored;

translating the received data of a first language into a second language upon the comparing indicating that the portion of the received and previously stored data do not match; and outputting the translated data and outputting the received data upon a portion matching the received data previously stored, without translation.

13. The data processing method of claim 12, further comprising the step of:

storing the received data.

14. The data processing method of claim 13, wherein the received data and the received previously stored data further include a translation environment, the data processing method further comprising the step of:

comparing the translation environments of the received data and received previously stored data and translating the received data upon the comparing indicating that the translation environments do not match.

15. The data processing method of claim 12, wherein the portion of the received data includes a URL address.

16. The data processing method of claim 15, wherein the received URL address is compared with a URL address of the received data previously stored, and the received data is not translated when the received URL address matches a URL address of the received data previously stored.

17. An article of manufacture comprising:

a computer readable medium including,
   first computer readable program code segment for causing a computer to receive data from a computer network;
   second computer readable program code segment for causing a computer to store the received data;
   third computer readable program code segment for causing a computer to output the stored received data;
   fourth computer readable program code segment for causing a computer to compare, upon interruption of the receiving of data from the computer network, a portion of the received data with a portion of received data previously stored, wherein, if a match is determined, the received data is not translated and the received data previously stored is output; and
   fifth computer readable program code segment for causing a computer to translate, upon a match not being determined, the received data of a first language into a translated text of a second language, the second computer readable program code means thereafter causing the computer to store the translated text.

18. The article of manufacture of claim 17, wherein the third computer readable program code means further causes the computer to output the translated text.

19. The article of manufacture of claim 18, wherein the third computer readable program code means further causes the computer to output received data, other than text data, and causes the computer to output the translated text.

20. The article of manufacture of claim 17, wherein the portion of the received data includes a URL address.

21. The article of manufacture of claim 20, wherein the fourth computer readable program code means further causes the computer to compare the received URL address to a URL address of the received data previously stored, wherein, if a URL address match is determined, the received data is not translated and the received data previously stored is output.

* * * * *